(12) United States Patent
Tatourian et al.

(10) Patent No.: US 10,025,294 B2
(45) Date of Patent: Jul. 17, 2018

(54) APPAREL ITEMS SIMULATION APPARATUS AND METHODS

(71) Applicant: Intel Corporation, Santa Clara, CA (US)

(72) Inventors: Igor Tatourian, Santa Clara, CA (US); Sudip S. Chahal, Gold River, CA (US); Greeshma Yellareddy, San Francisco, CA (US); Norman Yee, Folsom, CA (US); Hong Li, El Dorado Hills, CA (US); Rita H. Wouhaybi, Portland, OR (US); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 14/664,321

(22) Filed: Mar. 20, 2015

(65) Prior Publication Data

US 2016/0271882 A1    Sep. 22, 2016

(51) Int. Cl.
*G06F 19/00* (2018.01)
*G05B 19/4099* (2006.01)

(52) U.S. Cl.
CPC ........ *G05B 19/4099* (2013.01); *G05B 2219/35134* (2013.01); *G05B 2219/49007* (2013.01); *Y02P 90/265* (2015.11)

(58) Field of Classification Search
CPC .......... B29C 67/0088; G05B 19/4099; G05B 2219/35134; G05B 2219/49007; B33Y 50/02; Y02P 90/30
USPC ........................................................ 700/98
See application file for complete search history.

(56) References Cited

U.S. PATENT DOCUMENTS

| 2004/0207705 A1 | 10/2004 | Ozawa |
| 2011/0109686 A1 | 5/2011 | McDowell et al. |
| 2014/0211224 A1 | 7/2014 | Abeloe |
| 2014/0277663 A1* | 9/2014 | Gupta ................ G06F 17/50 700/98 |

(Continued)

OTHER PUBLICATIONS

International Search Report and Written Opinion dated May 24, 2016 for International Application No. PCT/US2016/018341, 15 pages.

*Primary Examiner* — Robert Cassity
(74) *Attorney, Agent, or Firm* — Schwabe, Williamson & Wyatt, P.C.

(57) ABSTRACT

Embodiments described herein relate generally to simulating apparel items. A matching computer system may receive a request for an apparel item. The matching computer system may identify a 3D pattern corresponding to the apparel item. The matching computer system may provide this 3D pattern to a user agent computer system. The user agent computer system may cause a 3D printer to print a 3D artifact or modify an existing 3D artifact to simulate the requested apparel item. The modification of 3D artifact may be based on the data collected by the sensor(s) attached to the user which indicate the fitting and/or user feelings of the 3D apparel. The user agent computer system may print or modify the 3D artifact to include components that simulate characteristics of the requested apparel item. The 3D artifact may provide feedback to the user agent computer system based on sensing measurements. Other embodiments may be described and/or claimed.

25 Claims, 6 Drawing Sheets

(56) References Cited

U.S. PATENT DOCUMENTS

| | | | | |
|---|---|---|---|---|
| 2014/0300676 | A1* | 10/2014 | Miller | B41F 17/38 347/110 |
| 2014/0318699 | A1* | 10/2014 | Longinotti-Buitoni | A61B 5/0002 156/247 |
| 2015/0170250 | A1* | 6/2015 | Dalal | G06Q 30/0643 705/26.7 |
| 2015/0190052 | A1* | 7/2015 | Vaitaitis | A61B 5/0024 340/539.11 |
| 2015/0197063 | A1* | 7/2015 | Shinar | G06F 17/50 700/98 |
| 2016/0006723 | A1* | 1/2016 | Wilson | H04L 63/0823 713/175 |
| 2016/0349738 | A1* | 12/2016 | Sisk | B29C 67/0085 |

\* cited by examiner

APPAREL ITEMS SIMULATION APPARATUS AND METHODS

FIELD OF INVENTION

Embodiments of the present invention relate generally to the technical field of data processing, and more particularly, to sensors, three-dimensional printing, computer systems, and methods adapted to apparel items simulation using sensors and three-dimensional printing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Online shopping has become a ubiquitous form of consumerism. An inconvenience associated with buying apparel online is the inability to test out or try on apparel items. Without knowing how an apparel item may fit and feel, as well as how the apparel item may fit over time, the online buying experience is indefinite, often unsatisfactory, and may lead to returns and refunds, wasted time, and financial losses. Some online retailers may rely on, for example, crowdsourcing the experience of different apparel items in the form of reviews. However, reviews do not accurately predict whether the item will be suitable for each individual, as tastes may vary.

Some online retailers may rely on avatars to virtually model an apparel item for a person. However, just viewing how an item may look based on an avatar is insufficient to convey details about the look, feel, and the like associated with wearing an apparel item. Often, apparel is relatively expensive, so it may not be feasible for a person to buy an apparel item without some indication of how it will feel and/or wear over time. Therefore, a solution to address this problem is needed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
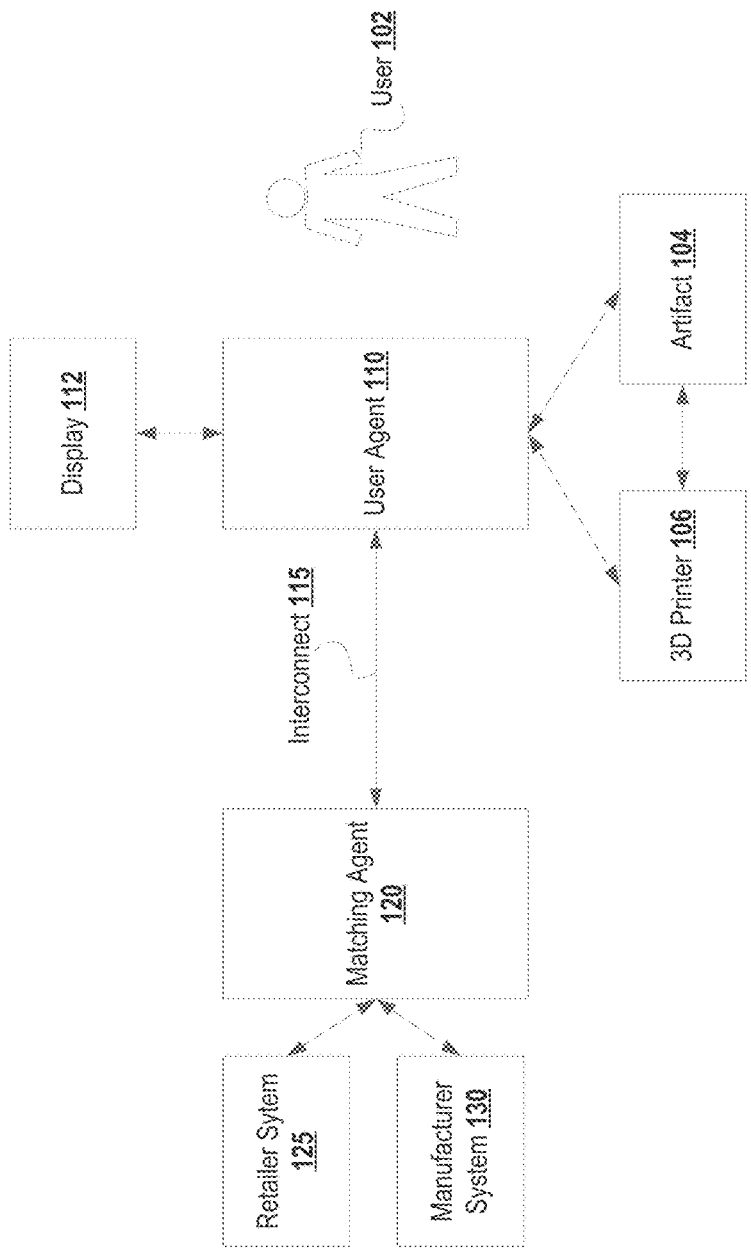
FIG. 1 is a block diagram illustrating an environment for facilitating the simulation of one or more apparel items, in accordance with various embodiments.

Beginning first with FIG. 1, a block diagram shows one embodiment of an environment for facilitating the simulation of one or more apparel items, in accordance with various embodiments. The environment may include, but is not limited to, a user agent 110 and a matching agent 120, each of which may incorporate the teachings of the present disclosure. The matching agent 120 may be communicatively coupled with one or more third party systems, such as a retailer system 125 and/or a manufacturer system 130. The retailer system 125 and/or the manufacturer system 130 may be computer systems that offer for sale and/or will offer for sale apparel and/or textiles to be used in apparel manufacture. The retailer system 125 and/or the manufacturer system 130 may have stored therein or accessible information associated with one or more apparel items, such as sizing, measurements, options, and the like.

In various embodiments, a matching agent 120 may have stored therein or accessible thereto a plurality of 3D patterns associated with a plurality of apparel items. In various embodiments, one or both of the apparel items and the 3D patterns corresponding thereto may be accessible by the matching agent 120 through the retailer 125 and/or the manufacturer system 130. The matching agent 120 may communicate with the retailer 125 and/or the manufacturer 130 over a network, such as the Internet. Except for the teachings of the present disclosure, the matching agent 120 may comprise, for example, a server, a desktop computer, a laptop computer, a portable electronic computer device, a cloud computing system, or essentially any other computer system adapted to transmit signals over a network, such as a cloud computing system. Examples of computer systems comprising the matching agent 120 include servers available from Hewlett Packard of Palo Alto, Calif., desktop or laptop computers available from Dell Computer of Austin, Tex., and so forth.

The matching agent 120 may be communicatively coupled with a user agent 110 over an interconnect 115. The interconnect 115 may be a network, such as the Internet. In another embodiment, the interconnect 115 may be a wireline and/or bus, such as in embodiments in which the matching agent 120 and the user agent 110 comprise a same computer system. In some embodiments, the matching agent 120 may be communicatively coupled with a plurality of user agents similar to the user agent 110.

Except for the teachings of the present disclosure, the user agent 110 may comprise, for example, a server, a desktop computer, a laptop computer, a portable electronic computer device, a smartphone, a personal data assistant, a tablet computer, an eBook reader, or essentially any other computer device adapted to transmit signals over a network. Examples of computer system comprising the user agent 110 include servers available from Hewlett Packard of Palo Alto, Calif., desktop or laptop computers available from Dell Computer of Austin, Tex., smartphones and computing tablets available from Apple Computer of Cupertino, Calif., game consoles available from Nintendo Corporation of Tokyo, Japan, and so forth.

The user agent 110 may be coupled with a display 112, a three-dimensional ("3D") printer, and/or an artifact 104. In various embodiments, a user agent 110 may have stored therein or accessible thereto a plurality of 3D patterns associated with a plurality of apparel items. In various embodiments, one or both of the apparel items and the 3D patterns corresponding thereto may be accessible by the user agent 110 through the matching agent 120. In some embodiments, the user agent 110 may communicate with the retailer system 125 and/or the manufacturer system 130 to obtain one or more 3D patterns.

According to some embodiments, the user agent 110 may be adapted to generate a 3D pattern corresponding to an apparel item. For example, the user agent 110 may receive an indication of an apparel item through the matching agent 120 or the retailer system 125 and, based on the indication, generate a 3D pattern corresponding to the apparel item, for example, based on measurements, sizing, and/or other characteristics associated with the apparel item and/or included in the indication.

In embodiments, a 3D pattern may define characteristics of an artifact 104, such as shape, size, measurements, tactile feeling (e.g., rigidity and/or coarseness), and/or other characteristics. Because the 3D pattern is to be based on an apparel item, the artifact 104 may correspond to that same apparel item. In various embodiments, an apparel item may be a shirt, a jacket, pants, shoes, a glove, a hat, or the like. Thus, the 3D pattern may substantially simulate, for example, a shirt, a jacket, pants, shoes, a glove, a hat, or the like.

In various embodiments, the user agent 110 may determine one or more locations at which one or more components associated with simulation of the apparel items are to be disposed. The one or more locations on the artifact 104 may be stored values and/or reflected in the 3D pattern. Examples of components include sensors and/or actuators, such as an actuator to cause the artifact 104 to adjust shape, a sensor to detect one or more positions of the artifact 104 relative to a user 102, a sensor to detect one or more positions of the artifact 104 relative to an apparel item (not shown), a device to generate an electric current to simulate the apparel item, a device to generate a magnetic current to simulate the apparel item, or a device to generate an acoustic field to simulate the apparel item.

In various embodiments, the artifact 104 may be preexisting, such as an element with one or more actuators (not shown) configured to change the shape of the artifact 104, for example, in response to input from the user agent 110. The user agent 110 may be communicatively coupled with the artifact 104, such as over a wireless connection (e.g., Bluetooth, Flashlinq, radio-frequency identification ("RFID"), Wi-Fi, Wi-Fi Direct, infrared data association ("IrDA"), and the like) and/or a wired connection (e.g., a detachable Universal Serial Bus ("USB") connection or the like). In such embodiments, the user agent 110 may modify the shape of the artifact 104, such as by triggering one or more actuators in the artifact 104.

Based on data communicated from the user agent 110 to the artifact 104, the one or more characteristics of the artifact 104 may be modified in one or more ways. For example, the size of the artifact 104 may be adjusted, such as by constricting and/or expanding one or more areas of the artifact 104 (e.g., areas at which one or more actuators may be disposed). Similarly, the shape of the artifact 104 may be adjusted to simulate different items of apparel—e.g., different areas of the artifact 104 may be constricted and/or expanded to simulate a pair of pants, whereas other areas of the artifact 104 may be constricted and/or expanded to simulate a shirt.

According to another embodiment, the user agent 110 may print the artifact 104 using a 3D printer 106. The 3D printer 106 may be communicatively coupled with the user agent 110 via any suitable wired (e.g., a detachable USB connection or the like) or wireless connection (e.g., Bluetooth, Flashlinq, RFID, Wi-Fi, Wi-Fi Direct, IrDA, and the like). Examples of 3D printers include 3D printers available from 3D Systems Corporation of Rock Hill, S.C., Stratasys of Eden Prairie, Minn., VoxelJet of Canton, Mich., ExOne of North Huntingdon, Pa., and Proto Labs of Maple Pain, Minn.

The user agent 110 may cause the 3D printer 106 to print the artifact according to the 3D pattern so that characteristics defined in the 3D pattern are reflected by the printed artifact 104. In various embodiments, the user agent 110 may cause the 3D printer 106 to print the artifact so that the one or more components are disposed thereon at determined location(s).

According to one embodiment, a user 102 may interact with the user agent 110 to make adjustments to the artifact 104. For example, the user agent 110 may cause one or more actuators to modify the artifact 104 in response to input from a user 102. In other embodiments, the user agent 110 may cause other adjustments and/or modifications to the artifact 104 and/or may cause another artifact to be printed through the 3D printer 106 to in response to input from the user 102 (e.g., input of a size, shape, color, pattern, accessories, and the like).

In various embodiments, one or more components (e.g., sensors) disposed on the artifact 104 may cause the artifact 104 to simulate a corresponding apparel item. For example, acoustic waves, magnetic waves, and/or electric current generated by one or more components may stimulate skin neurons of the user 102 to generate sensation of a feeling of wearing the actual apparel item to which the artifact 104 corresponds. In some embodiments, the user agent 110 may detect spatial gestures from the user 102 that are to cause manipulations of the color, pattern, accessories, and like associated with the image of the user 102 and the apparel item presented on the display 112.

In some embodiments, the user agent 110 may be communicatively coupled with a display 112. The user agent 110 may cause the display 112 to present an image of the user 102 wearing the apparel item, such as when the user puts on the artifact 104. The user agent 110 may cause the image of the apparel item to be presented on the display 112 to reflect changes to the apparel item (e.g., color, pattern, and the like) without effecting any changes to the artifact 104. In connection with one or more components disposed on the artifact 104, the user agent 110 may facilitate simulation of both the look and feel of the apparel item. In some embodiments, the user agent 110 may be communicatively coupled with a camera (not shown) to capture one or more images of the user 102.

One or more of the components (e.g., sensors) disposed on the artifact 104 may be adapted to provide feedback to the user agent 110. For example, one or more of the components may be configured to detect a measurement or size, for example, based on a detected relative distance. In one embodiment, a user 102 may put on the artifact 104 and one or more components disposed in the artifact may be configured to detect characteristics (e.g., measurements, size, shape, etc.), for example, based on detected relative distance of a component from the user 102. In another embodiment, the artifact 104 may be placed inside and/or around an existing apparel item (e.g., an apparel item owned by the user) and one or more components may detect characteristics (e.g., measurements, size, rigidity, color, etc.) or the existing apparel item.

These characteristics may be transmitted by the artifact 104 to the user agent 110 and/or the matching agent 120. The user agent 110 may store these characteristics and/or transmit these characteristics to another computer system, such as the matching agent 120 and/or a retailer system 110. In some embodiments, the user agent 110 may use these transmitted characteristics as at least a part of a request for a 3D pattern, for example, to reflect measurements of a user 102 and/or an existing apparel item (e.g., owned or accessible to the user 102).

In various embodiments, the user agent 110 may receive parameters from the user 102 that may be used to identify an apparel item. One or more parameters may be, for example, price range, a material preference, a color preference, a size preference, a brand preference, or the like. In some embodiments, these one or more parameters may be used in combination with characteristics received from components disposed on the artifact 104 to request an apparel item, 3D pattern, order an apparel item, and/or indicate potential gift ideas to another individual.

In embodiments, the parameters and/or characteristics may be transmitted to the matching agent 120 for identification of an apparel item that fits the parameters requested by the user 102 and the characteristics detected by the artifact 104. The matching agent 120 may communicate these parameters and/or characteristics to the retailer system 125 and/or the manufacturer system 130 (e.g., so that an apparel item may be fabricated and/or ordered).

Figure 2:
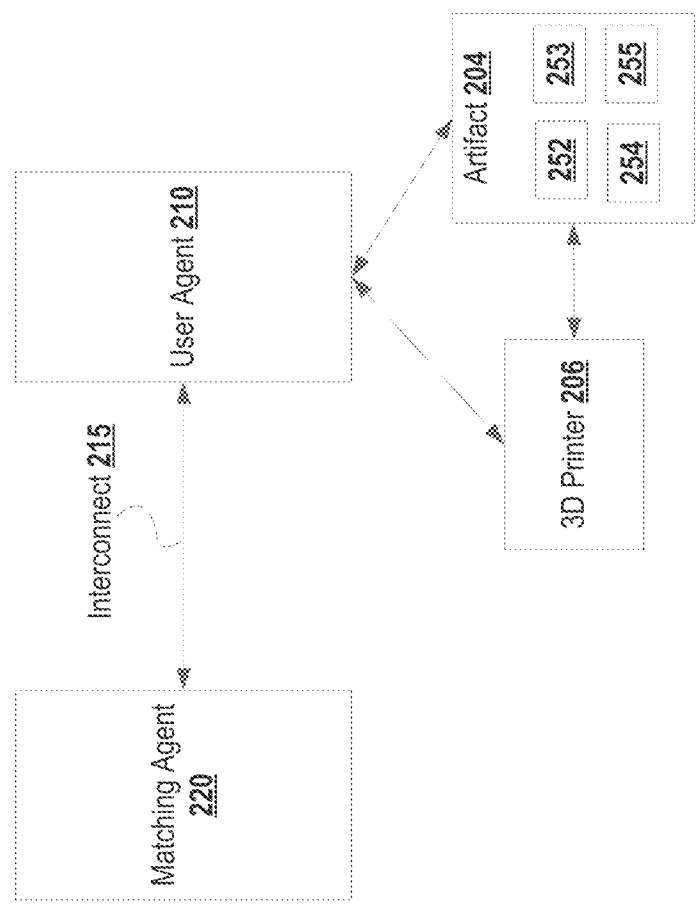
FIG. 2 is a block diagram illustrating another embodiment of an environment for facilitating simulation of an apparel item, in accordance with various embodiments.

Turning now to FIG. 2, a block diagram shows another embodiment of an environment for facilitating simulation of an apparel item, in accordance with various embodiments. FIG. 2 illustrates another environment in which the teachings of the present disclosure may be adapted and, therefore, the user agent 210 may be an embodiment of the user agent 110, the matching agent 220 may be an embodiment of the matching agent 120, the 3D printer 206 may be an embodiment of the 3D printer 106, and/or the artifact 204 may be an embodiment of the artifact 104, as illustrated in FIG. 1.

In the environment of FIG. 2, the matching agent 220 and/or the user agent 210 may search through one or more collections of apparel items, such as catalogs available from retailers over the Internet. The matching agent 220 and/or the user agent 210 may identify 3D patterns corresponding to apparel items based on the search. In various embodiments, search criteria employed by the matching agent 220 and/or the user agent 210 may include price range, retailer, brand, delivery options, and the like. In one embodiment, search criteria may include feedback from one or more components 252-255 disposed on the artifact 204 and/or components disposed on another apparel item, for example, that indicate frequency or average time and/or date that a user may wear the other apparel item. In one embodiment, the search criteria may include parameters received at the user agent 210 through user input.

In instances in which the user agent 210 and/or the matching agent 220 are unable to identify a corresponding 3D pattern through a retailer (e.g., the retailer has not made a 3D pattern available for an apparel item), the user agent 210 and/or the matching agent 220 may generate a 3D pattern and/or search for other similar apparel items with similar or same characteristics (e.g., search at other retailers).

As disclosed herein, the user agent 210 may use the 3D pattern to modify the artifact 204 and/or print the artifact 204 using the 3D printer 206. In embodiments, the user agent 210 may determine one or more locations at which to dispose and/or to activate one or more components 252-255. For example, the user agent 210 may cause a first component 252 to be actuated based on the 3D pattern to modify the shape of the artifact. In a further example, the user agent 210 may cause a second component 253 to detect a measurement (e.g., a relative distance) based on the location of the sensor on the artifact 204 relative to another object (e.g., a user and/or a physical apparel item).

In various embodiments, one or more of the components 252-255 may facilitate simulation of the apparel item by the artifact 204. For example, the user agent 210 may cause a first component 252 to generate a magnetic and/or acoustic wave to simulate a feel and/or texture of an apparel item. In another example, the user agent 210 may cause a second component 253 to produce a smell associated with an apparel item. Additionally, one or more of the components 252-255 may be actuated to simulate rigidity, coarseness, or another sensation associated with the apparel item.

According to one embodiment, the artifact 204 may be printed or modified to be worn by a user. For example, the user agent 210 may cause the artifact 204 to be modified or printed by the 3D printer 206 to correspond to an apparel item identified through a search. A user may then wear the artifact 204 to evaluate the fit and/or feel of the apparel item, for example, as simulated by the characteristics (e.g., shape and/or size) of the artifact 204 and output from one or more components 252-255.

The user agent 210 may then receive input, for example, from the user and/or from one or more of the components 252-255. In the case of user input, the user agent 210 may receive an indication of one or more characteristics of the artifact that are to be modified according to user preference (e.g., a size or other measurement). The user agent 210 may receive an indication of a purchase order or other feedback from the user associated with the apparel item corresponding to the 3D pattern from which the artifact 204 is modified or printed. In the case of component 252-255 input, the user agent 210 may receive an indication of the fit of the artifact 204 relative to the user.

In another embodiment, the artifact 204 may be printed or modified to be positioned inside or around an existing apparel item (not shown), such as an apparel item owned by the user or accessible to the user at a shopping center. For example, the user agent 210 may cause the artifact 204 to be modified or printed by the 3D printer 206 to correspond to a general shape of an apparel item (e.g., a shoe, a jacket, pants, etc.). The artifact 204 may then be inserted into or disposed about an existing apparel item, such to evaluate characteristics of the apparel item. In one embodiment, output from one or more components 252-255 may provide feedback to the user agent 210. For example, one or more components 252-255 may be a sensor configured to detect size, dimensions, measurements, and the like based on relative position of a component's disposed position from the apparel item.

The output from the one or more components 252-255 may be communicated to the user agent 210 and/or the matching agent 220. At the user agent 210 and/or the matching agent 220, characteristics of the apparel item may be evaluated based on the feedback from the one or more components 252-255. In this way, the matching agent 220 may identify other apparel items that offer similar and or same characteristics as the apparel item in or about which the artifact 204 is positioned.

According to various embodiments, the user agent 210 may be configured to send information to another system (e.g., the matching agent 220 or another computer system (not shown). For example, the user agent 210 may transmit characteristics (e.g., measurements) based on feedback from one or more components 252-255 and/or other parameters associated with an apparel item to another computer system so that a user of the user agent 210 may request a gift from another individual.

In some embodiments, characteristics of an existing apparel item, based on feedback from one or more components 252-255, may be used to provide data about an existing apparel item after a period of time or wear. For example, an existing pair of shoes may change in shape and/or feel about a duration of wear by a user. Based on feedback provided by the one or more components 252-255, the matching agent 220 may be configured to provide data about how an apparel item may change over time.

The matching agent 220 may be adapted to provide this data to other user agents (not shown) similar to the user agent 210. This data may be aggregated with other data and/or anonymized in storage accessible to the matching agent 220. The matching agent 220 may be configured to provide such data to another user agent, for example, based on a search. The matching agent 220 may further be configured to provide such data to a retailer and/or manufacturer. In this way, "crowd sourced" data may contribute to providing information for understanding and evaluating fit, wear and tear, quality, and the like of apparel items as apparel items are being used and/or washed.

According to some embodiments, existing apparel items may be manufactured and/or fitted with sensors similar to one or more of the components 252-255. Feedback from these sensors may be received by the matching agent 220 and the matching agent 220 may store this information in storage accessible thereto, for example, so that searches performed through the user agent 210 may be more robust and/or so that retailers and/or manufacturers may evaluate characteristics of apparel items (e.g., for quality control and/or warranty purposes).

Figure 3:
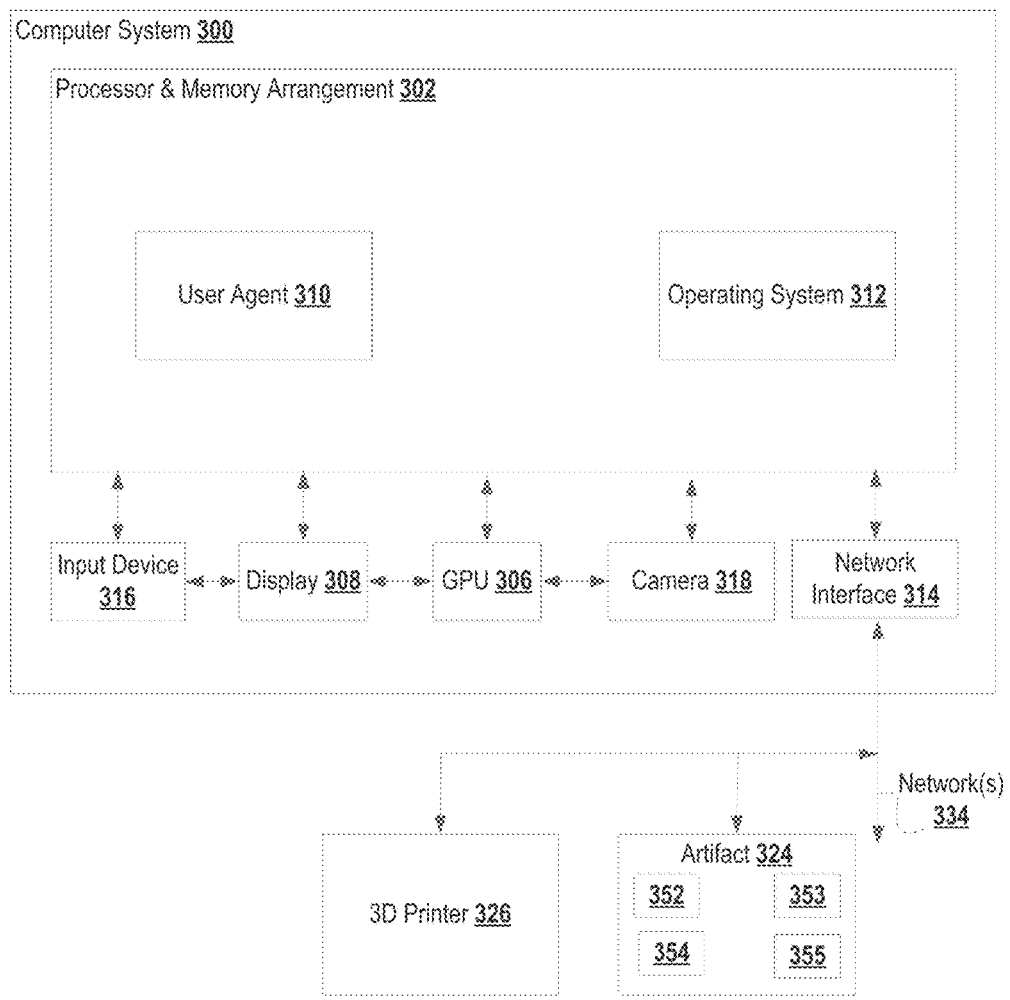
FIG. 3 is a block diagram illustrating a computer system having a user agent to facilitate simulation of an apparel item, in accordance with various embodiments.

With reference now to FIG. 3, a block diagram is shown illustrating a computer system 300 having a user agent 310 to facilitate simulation of an apparel item, in accordance with various embodiments. The user agent 310 may be an embodiment of the user agent 110, the 3D printer 326 may be an embodiment of the 3D printer 106, and/or the artifact 324 may be an embodiment of the artifact 104 illustrated in FIG. 1.

The computer system 300 may be a server, a desktop computer, a laptop computer, a tablet computer, a smartphone, a personal digital assistant, a game console, an Internet appliance, or other computing systems of the like. Examples of a computer system 300 may include, but are not limited to, the servers available from Hewlett Packard of Palo Alto, Calif., desktop or ustinlaptop computers available from Dell Computer of A, Texas, smartphones and computing tablets available from Apple Computer of Cupertino, Calif., game consoles available from Nintendo Corporation of Tokyo, Japan, and so forth.

As shown, the computer system 300 may include, but is not limited to, a processor and memory arrangement 302, a graphics processing unit ("GPU") 306, a display 308, a network interface 314, an input device 316, and a camera 318. The processor and memory arrangement 302 may be configured to execute at least an operating system 312 and a user agent 310.

The processor and memory arrangement 302 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth. In various embodiments, the GPU 306 may be configured to provide video decoding and/or graphics processing functions to the operating system 312, while the display 308 may be configured to enable content to be rendered thereon. Similarly, the GPU 306 and the display 308 are intended to represent a broad range of graphics processors and display elements known in the art.

The network interface 314 may be comprised of transmit circuitry and/or receive circuitry. The network interface 314 may be configured to transmit and/or receive data over any number of different wired and/or wireless networks. Accordingly, the one or more network(s) 334 is (are) intended to represent a broad range of networks known in the art. Examples of network(s) 334 may include wired or wireless, local or wide area, private or public networks, including the Internet.

In various embodiments, the operating system 312 may be configured to initiate the execution of the instructions, such as instructions provided by the user agent 310. In particular, the operating system 312 may be adapted to serve as a platform for running the user agent 310. The operating system 312 may be adapted to perform other operations across the components of the computer system 300, including threading, resource management, data storage control, and other similar functionalities.

The operating system 312 may cause the processor and memory arrangement 302 to execute instructions for the user agent 310. The user agent 310 may include code representing instructions configured to cause the 3D printer 326 to print the artifact 304 and/or cause modification to the artifact 304. For example, the user agent 310 may access a 3D pattern corresponding to an apparel item in memory of the arrangement 302 and/or from another computer system (not shown) over the network(s) 334. In one embodiment, the user agent may transmit a request over the network(s) 334 to another computer system for a 3D pattern corresponding to an apparel item. This request may be anonymized so as to protect the identity of the user agent 310 and/or the computer system 300.

Based on the 3D pattern, the user agent 310 may cause modification to the artifact 324 by communicating signals to the artifact 324 over the network(s) 334. For example, the user agent 310 may cause one or more components 352-355 to actuate so that a shape, size, etc. of the artifact is modified to simulate the apparel item corresponding to the 3D pattern. In another embodiment, the user agent 310 may communicate with the 3D printer 326 over the network(s) 334 to cause the 3D printer to print the artifact based on the 3D pattern.

The user agent 310 may determine locations at which one or more components 352-355 are to be positioned and/or activated in order to facilitate simulation of the apparel item. In various embodiments, one or more of the components 352-355 may be one or more of an actuator to cause the artifact 324 to adjust shape, a sensor to detect one or more positions of the artifact 324 relative to a user, a sensor to detect one or more positions of the artifact relative 324 to an apparel item, a device to generate an electric current to simulate the apparel item, a device to generate a magnetic current to simulate the apparel item, or a device to generate an acoustic field to simulate the apparel item.

In some embodiments, the locations of the one or more components 352-355 may be indicated in the 3D pattern or in data associated with the 3D pattern. In another embodiment, the user agent 310 may be configured to select one or more locations. The locations of the one or more components 352-355 may be based on embodiments of the artifact 324—e.g., components 352-355 may be differently disposed and/or activated on the artifact 324 depending upon whether the artifact 324 is intended to be worn by the user or disposed in or around an existing apparel item.

The computer system 300 may include an input device 316 to receive input from a user. The input device 316 may allow a user to interact with the computer system 300 through various means, according to different embodiments—e.g., the input device 316 may be presented to a user on a display 308 as a graphical user interface or through a command line interface. The input device 316 may be implemented in hardware, software, or a combination of the two and may include or may be communicatively coupled with one or more hardware devices suitable for user input (e.g., a keyboard, mouse, or touch screen).

In various embodiments, the input device 316 may be coupled with the user agent 310. The user agent 310 may receive, through the input device 316, an input. The input may be comprised of one or more parameters associated with an apparel item. Based on such a received input, the user agent 310 may identify at least one 3D pattern corresponding to the apparel item. For example, the user agent 310 may communicate with another computer system) not shown (such as a matching agent, over the network(s) 334.

The artifact 324 may provide feedback to the user agent over the network(s) 334. For example, one or more components 352-355 may sense a distance relative to a user after the user has put on the artifact 324. In another example, the one or more components 352-355 may sense a distance relative to an existing apparel item after the artifact 324 has been disposed in or around an existing apparel item. This feedback may be communicated to the user agent 324 over the network(s) 334. In response, the user agent 310 may calculate measurements such as dimensions, size, and the like and/or may communicate this feedback to another computer system, such as a matching agent.

In various embodiments, the user agent 310 may be adapted to send feedback and/or parameters associated with an apparel item through the input device 316 to another computer system. In one example, the user agent 310 may request additional apparel items and/or 3D patterns (e.g., from a matching agent) based on feedback from the components 325-355 as well as other parameters received through the input device 316. In another example, a user may wish to request a gift and, therefore, the user agent 310 may send one or more messages to another computer system indicating characteristics based on feedback from the components 325-355 as well as other parameters.

In some embodiments, the user agent 310 may cause the display 308 to present an image of the wearing the apparel item, such as when the user puts on the artifact 324. The user agent 310 may cause the image of the apparel item to be presented on the display 308 to reflect changes to the apparel item (e.g., color, pattern, and the like) without effecting any changes to the artifact 324. In some embodiments, the user agent 310 may be communicatively coupled with a camera 318 to capture one or more images of the user and the apparel item to present an image on the display 308 of the user with the apparel item superimposed thereon.

In some embodiments, the user agent 310 may be configured to create and/or store a digital profile of a user. This digital profile may be based on feedback from the one or more components 352-355, as well as other parameters, so that searches performed through the user agent 410 may more accurately capture characteristics of apparel items that may be more desirable to a user. In some embodiments, this digital profile may be remotely available through the user agent 410, such as through a Quick Response ("QR") code.

Figure 4:
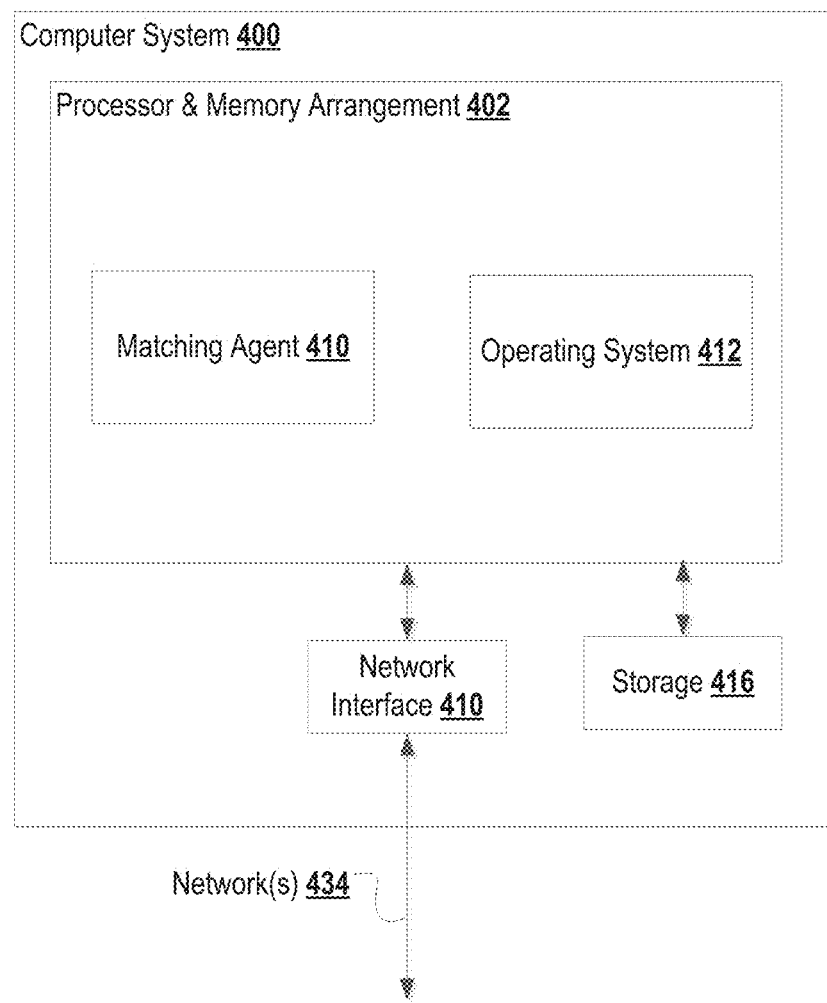
FIG. 4 is a block diagram illustrating a computer system 400 having a matching agent 310 to facilitate provision of three-dimensional patterns associated with apparel items, in accordance with various embodiments.

Turning to FIG. 4, a block diagram is shown illustrating a computer system 400 having a matching agent 310 to facilitate provision of three-dimensional patterns associated with apparel items, in accordance with various embodiments. The matching agent 410 may be an embodiment of the matching agent 120 illustrated in FIG. 1.

The computer system 400 may be a server, a desktop computer, a personal digital assistant, an Internet appliance, or other computing systems of the like. Examples of a computer system 400 may include, but are not limited to, the servers available from Hewlett Packard of Palo Alto, Calif., laptop computers available from Dell Computer of Austin, xasTe, and so forth.

As shown, the computer system 400 may include, but is not limited to, a processor and memory arrangement 402, a network interface 414, and storage 416. The processor and memory arrangement 402 may be configured to execute at least an operating system 412 and a matching agent 410.

The processor and memory arrangement 402 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth. In various embodiments, the storage 416 is intended to represent a broad range of non-volatile memory, such as include read-only memory, flash memory, ferroelectric RAM (F-RAM), various types of magnetic computer storage devices (e.g., hard disks, floppy disks, and magnetic tape), optical discs, and other storage elements known in the art. In embodiments, some or all of the storage 316 may be integrated with some or all of the memory of the processor and memory arrangement 402.

The network interface 414 may be comprised of transmit circuitry and/or receive circuitry. The network interface 414 may be configured to transmit and/or receive data over any number of different wired and/or wireless networks. Accordingly, the one or more network(s) 434 is (are) intended to represent a broad range of networks known in the art. Examples of network(s) 434 may include wired or wireless, local or wide area, private or public networks, including the Internet.

In various embodiments, the operating system 412 may be configured to initiate the execution of the instructions, such as instructions provided by the matching agent 410. In particular, the operating system 412 may be adapted to serve as a platform for running the matching agent 410. The operating system 412 may be adapted to perform other operations across the components of the computer system 400, including threading, resource management, data storage control, and other similar functionalities.

The operating system 412 may cause the processor and memory arrangement 402 to execute instructions for the matching agent 410. The matching agent 410 may include code representing instructions configured to provide one or more 3D patterns in response to a request from another computer system (not shown), such as a user agent.

In various embodiments, the matching agent 410 may receive, over the network(s) 434, a request associated with apparel that includes one or more criteria. Examples of criteria include parameters from a user agent, such as a price range, a material preference, a color preference, a size preference, and/or a brand preference. In some embodiments, the criteria may include feedback from a sensor embedded in a three-dimensional artifact. In one embodiment, this request is anonymized so as to protect the identity of the requester (e.g., a user agent).

The matching agent may be configured to identify at least one apparel item based on the request and the one or more criteria included therein. For example, the matching agent 410 may access the storage 416 to identify one or more apparel items that satisfy one or more criteria. In another embodiment, the matching agent 410 may be configured to communicate with another computer system over the network(s) 434 to identify one or more apparel items based on the request. For example, the matching agent 410 may communicate with a computer system of a retailer and/or manufacturer and/or may communicate with a cloud computing server. In some embodiments, the matching agent 410 may be configured to anonymize the request so as to protect the identity of the requester (e.g., a user agent).

In various embodiments, the matching agent 410 may be configured to identify at least one 3D pattern corresponding to the at least one identified apparel item. This 3D pattern may be used by another computer system (e.g., a user agent) for printing, by a 3D printer, a 3D artifact or modifying a 3D artifact that is to simulate the at least one apparel item. In some embodiments, the 3D pattern may indicate one or more locations at which one or more components are to be disposed and/or activated on the artifact.

The matching agent 410 may access the storage 416 to identify a 3D pattern that corresponds to the at least one apparel item. In another embodiment, the matching agent 410 may be configured to communicate with another computer system over the network(s) 434 to identify a 3D pattern that corresponds to the at least one apparel item. For example, the matching agent 410 may communicate with a computer system of a retailer and/or manufacturer and/or may communicate with a cloud computing server.

In one embodiment, the matching agent 410 may be configured to generate a 3D pattern corresponding to the at least one apparel item. In another embodiment, the matching agent 410 may be configured to search for other apparel items similar to the at least one apparel item in order to identify a 3D pattern with similar or same characteristics.

In response to the request, the matching agent 410 may be configured to provide the at least one 3D pattern. The matching agent 410 may communicate this request over the network(s) 334 to a user agent.

In various embodiments, the matching agent 410 may be configured to receive data from a user agent that is associated with an artifact printed or modified based on the 3D pattern. This data may comprise feedback from sensors in the artifact that indicate size, shape, and/or other measurements relative to the user. The matching agent 410 may be configured to store this data, for example, in storage 416 and/or at a cloud computing server, so that data associated with the apparel item based on the artifact may be accessed (e.g., by a retailer, manufacturer, or other user agent) to indicate characteristics of the apparel item.

Figure 5:
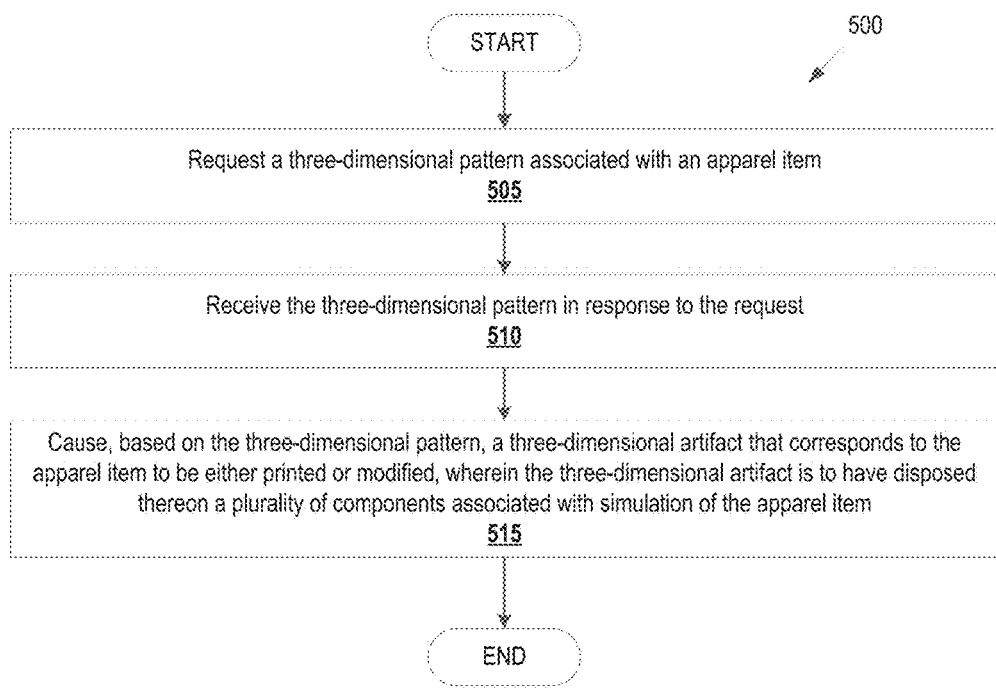
FIG. 5 is a flow diagram illustrating a method for facilitating simulation of an apparel item, in accordance with various embodiments.

Now with reference to FIG. 5, a flow diagram illustrates a method 500 for facilitating simulation of an apparel item, in accordance with various embodiments. The method 500 may be performed by a user agent, such as the user agent 110 of FIG. 1. While FIG. 5 illustrates a plurality of sequential operations, one of ordinary skill would understand that one or more operations of the method 500 may be transposed and/or performed contemporaneously.

The method 500 may include an operation 505 for requesting a 3D pattern associated with an apparel item. The request may include parameters from a user agent, such as a price range, a material preference, a color preference, a size preference, and/or a brand preference. In some embodiments, the request may include feedback from a component embedded in a 3D artifact. In one embodiment, this request is anonymized so as to protect the identity of the requester (e.g., a user agent. (This request may be transmitted to a matching agent over a network, such as the Internet.

Thereafter, operation 510 may include receiving the 3D pattern in response to the request. In some embodiments, the 3D pattern may indicate a plurality of locations at which one or more components are to be disposed and/or activated on a 3D artifact.

The method 500 may include an operation 515 for causing a 3D artifact to be printed or modified. This operation 515 may be based on the 3D pattern. In embodiments, the printed or modified 3D artifact is to correspond to the apparel item so that the 3D artifact may be worn by a user and/or disposed in or around an existing apparel item.

In embodiments, the 3D artifact is to be printed or modified so that a plurality of components are disposed and/or activated thereon. In embodiments in which the 3D artifact is modified, the plurality of components may be actuated, based on the 3D pattern, to modify the shape, size, and/or other characteristics of the 3D artifact to simulate the apparel item.

In some embodiments, the one or more components may simulate the apparel item. For example, the one or more components may generate acoustic waves, magnetic waves, and/or electric currents to simulate the feel, texture, rigidity, coarseness, etc. of the apparel item. In one embodiments, the one or more components may provide feedback (e.g., to a user agent) based on sensory feedback, such as a relative distance to the user and/or an existing apparel item.

Figure 6:
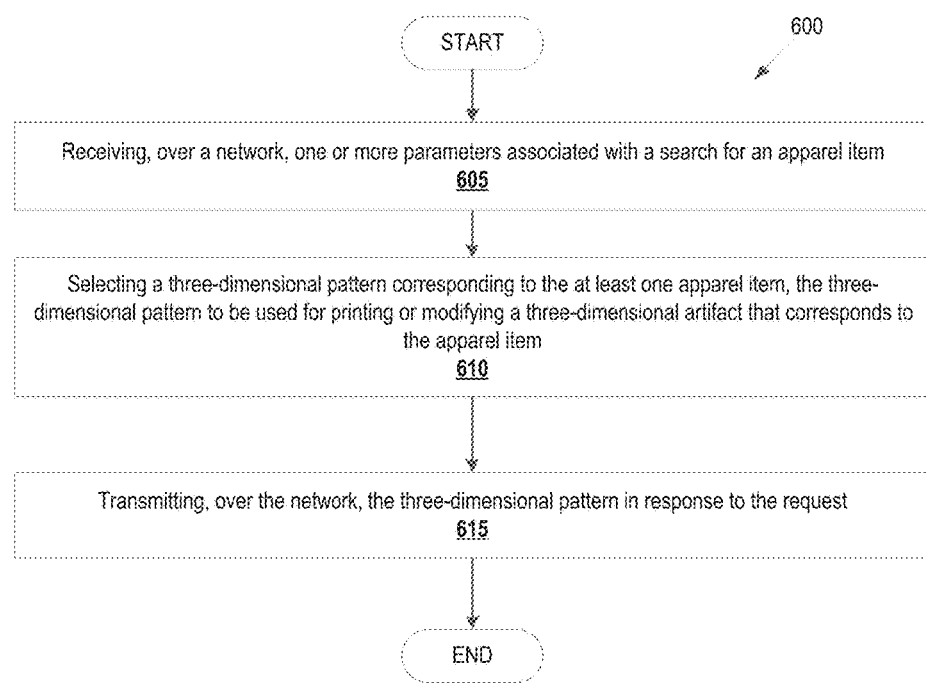
FIG. 6 is a flow diagram illustrating a method for providing a 3D pattern corresponding to an apparel item, in accordance with various embodiments.

Now with reference to FIG. 6, a flow diagram illustrates a method 600 for providing a 3D pattern corresponding to an apparel item, in accordance with various embodiments. The method 600 may be performed by a computer system, such as the matching agent 120 of FIG. 1. While FIG. 6 illustrates a plurality of sequential operations, one of ordinary skill would understand that one or more operations of the method 600 may be transposed and/or performed contemporaneously.

The method 600 may begin with operation 605 for receiving, over a network, one or more parameters associated with a search for an apparel item. In various embodiments, the one or more parameters may include a price range, a material preference, a color preference, a size preference, and/or a brand preference. In some embodiments, the one or more parameters may include feedback from a component embedded in a 3D artifact. The one or more parameters may be received from a user agent.

At operation 610, the method 600 may include selecting a 3D pattern corresponding to the apparel item. This 3D pattern is to be used for printing or modifying a three-dimensional artifact that corresponds to the apparel item. In various embodiments, this operation 610 may include accessing storage and/or communicating with another computer system (e.g., a cloud computing server or a third-party computer system). In one embodiment, this operation 610 may include selecting a 3D pattern associated with another apparel item having characteristics similar to another apparel item matching the search parameters.

Thereafter, operation 615 may include transmitting, over the network, the 3D pattern in response to the request. This 3D pattern may be transmitted to a user agent that is configured to print and/or modify 3D artifacts based on 3D patterns.

Example 1 may be a computing system to facilitate simulation of apparel, the computing system comprising: one or more processors; physical memory, coupled with the one or more processors, configured to store a three-dimensional pattern associated with an apparel item; a user agent, to be loaded into the physical memory and operated by the one or more processors, to: access the three-dimensional pattern associated with the apparel item; determine one or more locations on the three-dimensional pattern at which one or more components associated with simulation of the apparel item are to be disposed on an artifact corresponding to the apparel item; and provide the three-dimensional pattern to a three-dimensional printer to cause the three-dimensional printer to print the artifact corresponding to the apparel item and having the one or more components disposed at the one or more locations. Example 2 may include the computing system of example 1, wherein the apparel item is one of a shirt, a jacket, a hat, pants, a shoe, or a glove. Example 3 may include the computing system of example 1, wherein the one or more components comprise at least one of an actuator to cause the artifact to adjust shape, a sensor to detect one or more positions of the artifact relative to a user, a sensor to detect one or more positions of the artifact relative to an apparel item, a device to generate an electric current to simulate the apparel item, a device to generate a magnetic current to simulate the apparel item, or a device to generate an acoustic field to simulate the apparel item. Example 4 may include the computing system of any of examples 1-3, further comprising: receive circuitry, coupled with the user agent, to receive the three-dimensional pattern over a network. Example 5 may include the computing system of example 4, further comprising: transmit circuitry, coupled with the user agent, to transmit an indication of one or more criteria associated with one or more apparel items, wherein the user agent is to receive the one or more criteria and the reception of the three-dimensional pattern by the receive circuitry is based on the transmission of the indication of the one or more criteria. Example 6 may include the computing system of example 4, wherein the received three-dimensional pattern includes an indication of the one or more locations. Example 7 may include the computing system of example 4, wherein the receive circuitry is to receive one or more inputs from one or more of the components disposed on the artifact. Example 8 may include the computing system of example 7, further comprising: transmit circuitry, coupled with the user agent, to transmit information based on the received one or more inputs to an external computer system, wherein the user agent is to cause the transmit circuitry to transmit the information. Example 9 may include the computing system of example 8, wherein the information is further based on one or more user parameters. Example 10 may include the computing system of example 9, wherein the one or more user parameters include one or more of a price range, a material preference, a color preference, a size preference, or a brand preference. Example 11 may include the computing system of any of examples 1-3, further comprising: the three-dimensional printer. Example 12 may include the computing system of any of examples 1-3, wherein the user agent is to receive, from a camera device, one or more signals that capture at least a part of the artifact, and wherein the user agent is to cause a display screen to display a representation of the apparel item based on the one or more signals. Example 13 may include the computing system of any of examples 1-3, wherein the user agent is to generate the three-dimensional pattern.

Example 14 may be a computing system to facilitate provision of three-dimensional patterns associated with apparel items, the computing system comprising: one or more processors; physical memory, coupled with the one or more processors, configured to store an matching agent; the matching agent, to be loaded into the physical memory and operated by the one or more processors, to: receive a request associated with apparel that includes one or more criteria; identify at least one apparel item based on the one or more criteria; identify at least one three-dimensional pattern corresponding to the at least one apparel item, the three-dimensional pattern to be used for printing, by a three-dimensional printer, a three-dimensional artifact that is to simulate the at least one apparel item; and provide the at least one three-dimensional pattern in response to the request. Example 15 may include the computing system of example 14, wherein the apparel item is one of a shirt, a jacket, a hat, pants, a shoe, or a glove. Example 16 may include the computing system of example 14, wherein the matching agent is to access a cloud computing server to identify the at least one three-dimensional pattern. Example 17 may include the computing system of example 16, wherein the request is received through the cloud computing system. Example 18 may include the computing system of any of examples 14-17, wherein the three-dimensional pattern indicates one or more locations at which one or more sensors are to be disposed on the artifact. Example 19 may include the computing system of any of examples 14-17, wherein the one or more criteria includes one or more of a price range, a material preference, a color preference, a size preference, a brand preference, or feedback from a sensor embedded in a three-dimensional artifact. Example 20 may include the computing system of any of examples 14-17, wherein the request is anonymized.

Example 21 may be one or more non-transitory computer-readable media comprising computing device-executable instructions, wherein the instructions, in response to execution by a computing system, cause the computing system to: request a three-dimensional pattern associated with an apparel item; receive the three-dimensional pattern in response to the request; cause, based on the three-dimensional pattern, a three-dimensional artifact that corresponds to the apparel item to be either printed or modified, wherein the three-dimensional artifact is to have disposed thereon a plurality of components associated with simulation of the apparel item. Example 22 may include the one or more non-transitory computer-readable media of example 21, wherein the three-dimensional pattern indicates a plurality of locations at which the sensors are to be disposed on the three-dimensional artifact. Example 23 may include the one or more non-transitory computer-readable media of any of examples 21-22, wherein the apparel item is one of a shirt, a jacket, a hat, pants, a shoe, or a glove.

Example 24 may be a computer-implemented method comprising: receiving, over a network, a request comprising one or more parameters associated with a search for an apparel item; selecting a three-dimensional pattern corresponding to the apparel item, the three-dimensional pattern to be used for printing or modifying a three-dimensional artifact that corresponds to the apparel item; and transmitting, over the network, the three-dimensional pattern in response to the request. Example 25 may include the computer-implemented method of example 24, wherein the one or more parameters includes one or more of a price range, a material preference, a color preference, a size preference, a brand preference, or feedback from a sensor embedded in a three-dimensional object.

Example 26 may be a computer-implemented method comprising: requesting a three-dimensional pattern associated with an apparel item; processing the three-dimensional pattern in response to the request; causing, based on the three-dimensional pattern, a three-dimensional artifact that corresponds to the apparel item to be either printed or modified, wherein the three-dimensional artifact is to have disposed thereon a plurality of components associated with simulation of the apparel item. Example 27 may include the method of example 26, wherein the three-dimensional pattern indicates a plurality of locations at which the sensors are to be disposed on the three-dimensional artifact. Example 28 may include the method of example 26, wherein the apparel item is one of a shirt, a jacket, a hat, pants, a shoe, or a glove. Example 29 may include the method of example 26, wherein the one or more components comprise at least one of an actuator to cause the artifact to adjust shape, a sensor to detect one or more positions of the artifact relative to a user, a sensor to detect one or more positions of the artifact relative to an apparel item, a device to generate an electric current to simulate the apparel item, a device to generate a magnetic current to simulate the apparel item, or a device to generate an acoustic field to simulate the apparel item.

Example 30 may include the method of example 29, further comprising: receiving the three-dimensional pattern over a network. Example 31 may include the method of any of example 26-29, further comprising: receiving one or more inputs from one or more of the components disposed on the artifact. Example 32 may include the method of example 31, further comprising: transmitting information based on the received one or more inputs to an external computer system.

Example 33 may be an apparatus comprising: means for requesting a three-dimensional pattern associated with an apparel item; means for processing the three-dimensional pattern in response to the request; and means for causing, based on the three-dimensional pattern, a three-dimensional artifact that corresponds to the apparel item to be either printed or modified, wherein the three-dimensional artifact is to have disposed thereon a plurality of components associated with simulation of the apparel item. Example 34 may include the method of example 33, wherein the three-dimensional pattern indicates a plurality of locations at which the sensors are to be disposed on the three-dimensional artifact. Example 35 may include the method of example 33, wherein the apparel item is one of a shirt, a jacket, a hat, pants, a shoe, or a glove. Example 36 may include the method of example 33, wherein the one or more components comprise at least one of an actuator to cause the artifact to adjust shape, a sensor to detect one or more positions of the artifact relative to a user, a sensor to detect one or more positions of the artifact relative to an apparel item, a device to generate an electric current to simulate the apparel item, a device to generate a magnetic current to simulate the apparel item, or a device to generate an acoustic field to simulate the apparel item.

Example 37 may be one or more non-transitory computer-readable media comprising computing device-executable instructions, wherein the instructions, in response to execution by a computing system, cause the computing system to: receive, over a network, a request comprising one or more parameters associated with a search for an apparel item; select a three-dimensional pattern corresponding to the apparel item, the three-dimensional pattern to be used for printing or modifying a three-dimensional artifact that corresponds to the apparel item; and transmit, over the network, the three-dimensional pattern in response to the request. Example 38 may include the one or more non-transitory computer-readable media of example 37, wherein the one or more parameters includes one or more of a price range, a material preference, a color preference, a size preference, a brand preference, or feedback from a sensor embedded in a three-dimensional object. Example 39 may include the one or more non-transitory computer-readable media of any of examples 37-38, wherein the request is received through the cloud computing system.

Example 40 may include the one or more non-transitory computer-readable media of any of examples 37-38, wherein the three-dimensional pattern indicates one or more locations at which one or more sensors are to be disposed on the artifact.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices). Embodiments described herein may also include storage that is in a cloud (e.g., remote storage accessible over a network), which may be associated with the Internet of Things ("IoT"). In such embodiments, data may be distributed across multiple machines (e.g., computing systems and/or IoT devices), including a local machine.

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer system to facilitate simulation of apparel, the computer system comprising:
    one or more processors;
    physical memory, coupled with the one or more processors, configured to store a three-dimensional (3D) pattern associated with an apparel item, wherein the 3D pattern defines one or more characteristics of the apparel item;
    a user agent, to be loaded into the physical memory and operated by the one or more processors, to:
        access the 3D pattern associated with the apparel item;
        determine, based on the 3D pattern, one or more locations on an artifact at which one or more output devices are to be disposed, the one or more output devices to be used for simulation of the apparel item;
        provide the 3D pattern to a 3D printer to cause the 3D printer to print the artifact corresponding to the apparel item such that the printed artifact includes the one or more output devices disposed at the one or more determined locations; and
        control communication with the one or more output devices disposed on or at the printed artifact to cause activation of the one or more output devices, wherein activation of the one or more output devices is to simulate the one or more characteristics of the apparel item.

2. The computer system of claim 1, wherein an item type of the apparel item and the artifact is one of a shirt, a jacket, a hat, pants, a shoe, or a glove.

3. The computer system of claim 1, wherein the one or more output devices comprise at least one of an actuator to cause the artifact to adjust shape, a device to generate an electric current to simulate the apparel item, a device to generate a magnetic current to simulate the apparel item, or a device to generate an acoustic field to simulate the apparel item, and the artifact further comprises one or more sensors disposed on or in the artifact to detect one or more positions of the artifact relative to a user or one or more other sensors disposed on or in the artifact to detect one or more positions of the artifact relative to the apparel item.

4. The computer system of claim 1, further comprising:
    receive circuitry, coupled with the user agent, to receive the 3D pattern over a network.

5. The computer system of claim 4, further comprising:
    transmit circuitry, coupled with the user agent, to transmit an indication of one or more criteria associated with one or more apparel items,
    wherein the user agent is to receive the one or more criteria and the reception of the 3D pattern by the receive circuitry is based on the transmission of the indication of the one or more criteria.

6. The computer system of claim 4, wherein the received 3D pattern includes an indication of the one or more locations.

7. The computer system of claim 4, wherein the receive circuitry is to receive one or more inputs from one or more of the output devices disposed on the artifact.

8. The computer system of claim 7, further comprising:
    transmit circuitry, coupled with the user agent, to transmit information based on the received one or more inputs to an external computer system,
    wherein the user agent is to cause the transmit circuitry to transmit the information.

9. The computer system of claim 8, wherein the information is further based on one or more user parameters.

10. The computer system of claim 9, wherein the one or more user parameters include one or more of a price range, a material preference, a color preference, a size preference, or a brand preference.

11. The computer system of claim 1, further comprising: the 3D printer.

12. The computer system of claim 1, wherein the user agent is to receive, from a camera device, one or more signals that capture at least a part of the artifact, and wherein the user agent is to cause a display screen to display a representation of the apparel item based on the one or more signals.

13. The computer system of claim 1, wherein the user agent is to generate the 3D pattern.

14. A computer system to facilitate provision of three-dimensional (3D) patterns associated with apparel items, the computer system comprising:
    one or more processors;
    a physical memory, coupled with the one or more processors, configured to store a matching agent;
    the matching agent, to be loaded into the physical memory and operated by the one or more processors, to:
        receive a request associated with apparel that includes one or more criteria;
        identify at least one apparel item based on the one or more criteria;
        identify at least one three-dimensional (3D) pattern corresponding to the at least one apparel item, the 3D pattern to be used for printing, by a 3D printer, a 3D artifact including one or more output devices that are to simulate the at least one apparel item;
        provide the at least one 3D pattern in response to the request;
        receive feedback from the one or more output devices of the artifact, wherein the feedback indicates one or more characteristics of the artifact based on a position of each of the one or more output devices on the artifact relative to the at least one apparel item; and identify at least one other apparel item and at least one other 3D pattern corresponding to the at least one other apparel item based on the feedback.

15. The computer system of claim 14, wherein the apparel item is one of a shirt, a jacket, a hat, pants, a shoe, or a glove.

16. The computer system of claim 14, wherein the matching agent is to access a cloud computer service to identify the at least one 3D pattern.

17. The computer system of claim 16, wherein the request is received through the cloud computer service.

18. The computer system of claim 14, wherein the 3D pattern indicates one or more locations at which one or more sensors are to be disposed on the artifact.

19. The computer system of claim 14, wherein the one or more criteria includes one or more of a price range, a material preference, a color preference, a size preference, a brand preference, or feedback from a sensor embedded in a 3D artifact.

20. The computer system of claim 14, wherein the request is anonymized.

21. One or more non-transitory computer-readable media comprising computer device-executable instructions, wherein the instructions, in response to execution by a computer system, cause the computer system to:
   request a three-dimensional (3D) pattern associated with an apparel item, wherein the 3D pattern defines one or more characteristics of the apparel item;
   receive the 3D pattern in response to the request;
   cause, based on the 3D pattern, a 3D artifact that corresponds to the apparel item to be either printed or modified, wherein the 3D artifact is to have disposed thereon a plurality of output devices for simulation of the apparel item; and
   control communication with the plurality of output devices disposed on or at the printed artifact to cause activation of the plurality of output devices, wherein activation of the plurality of output devices is to simulate the one or more characteristics of the apparel item.

22. The one or more non-transitory computer-readable media of claim 21, wherein the 3D pattern indicates a plurality of locations at which sensors are to be disposed on the 3D artifact.

23. The one or more non-transitory computer-readable media of claim 21, wherein the apparel item is one of a shirt, a jacket, a hat, pants, a shoe, or a glove.

24. A computer-implemented method comprising:
   receiving, by a computer system over a network, a request comprising one or more parameters associated with a search for an apparel item;
   selecting, by the computer system, a three-dimensional (3D) pattern corresponding to the apparel item, the 3D pattern to be used for printing or modifying a 3D artifact that corresponds to the apparel item, the 3D artifact to include one or more output devices to be used to simulate the apparel item;
   transmitting, by the computer system over the network, the 3D pattern in response to the request;
   receiving, by the computer system over the network, feedback from the one or more output devices of the artifact, wherein the feedback indicates one or more characteristics of the artifact based on a position of each of the one or more output devices on the artifact relative to the apparel item; and
   identifying, by the computer system, another apparel item and another 3D pattern of the other apparel item based on the feedback.

25. The computer-implemented method of claim 24, wherein the one or more parameters includes one or more of a price range, a material preference, a color preference, a size preference, a brand preference, or feedback from a sensor embedded in a 3D object.

* * * * *